United States Patent
Hamer et al.

(10) Patent No.: US 12,455,172 B2
(45) Date of Patent: Oct. 28, 2025

(54) SYSTEM FOR GENERATING CONFIDENCE VALUES IN DIGITAL ROAD MAPS

(71) Applicant: Continental Automotive GmbH, Hannover (DE)

(72) Inventors: Henning Hamer, Munich (DE); Holger Karn, Munich (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 361 days.

(21) Appl. No.: 16/982,447

(22) PCT Filed: Mar. 21, 2019

(86) PCT No.: PCT/EP2019/057099
§ 371 (c)(1),
(2) Date: Sep. 18, 2020

(87) PCT Pub. No.: WO2019/180149
PCT Pub. Date: Sep. 26, 2019

(65) Prior Publication Data
US 2021/0003419 A1    Jan. 7, 2021

(30) Foreign Application Priority Data
Mar. 23, 2018   (DE) ..................... 10 2018 204 500.3

(51) Int. Cl.
*G01C 21/00*     (2006.01)
*B60W 60/00*     (2020.01)

(52) U.S. Cl.
CPC ....... *G01C 21/3815* (2020.08); *B60W 60/001* (2020.02); *G01C 21/3859* (2020.08)

(58) Field of Classification Search
CPC ............. B60W 60/001; G01C 21/3815; G01C 21/3859
See application file for complete search history.

(56) References Cited

U.S. PATENT DOCUMENTS 8,311,274 B2 * 11/2012 Bergmann ........... G06V 20/588
                                                382/103
8,467,810 B2 *  6/2013 Kaplan ................ G09B 29/004
                                                455/457
(Continued)

FOREIGN PATENT DOCUMENTS

AU       755096 B2    12/2002   ............. G01C 21/00
CN     1323432 A  *  11/2001   ........... G08G 1/0962
(Continued)

OTHER PUBLICATIONS

German Office Action, Application No. 102018204500.3, 8 pages, Nov. 14, 2018.
(Continued)

*Primary Examiner* — Aryan E Weisenfeld
(74) *Attorney, Agent, or Firm* — Slayden Grubert Beard PLLC (57) ABSTRACT

A system for generating confidence values for objects in a digital road map comprising a backend and an object recognition device including: a capture unit, an evaluation unit, a positioning unit, and a transceiver. The capture unit captures surroundings data of a vehicle. The positioning unit determines a position of the captured surroundings data and objects contained therein. The evaluation unit recognizes the objects and concealed objects based on the surroundings data and associates them with position information. The transceiver transmits information generated by the evaluation unit to the backend. The backend generates or updates the map. Each of the objects in the map has an associated confidence value. The backend adjusts the confidence values based on the received data. The backend does not reduce the confidence value of an object if there is a corresponding concealed object in the received data.

12 Claims, 2 Drawing Sheets

(56) References Cited

U.S. PATENT DOCUMENTS

| | | | | |
|---|---|---|---|---|
| 8,849,567 | B2* | 9/2014 | Gupta | G01C 21/3811 |
| | | | | 701/450 |
| 9,983,022 | B2* | 5/2018 | Horita | G06V 20/582 |
| 10,054,458 | B2* | 8/2018 | Oh | G06V 20/582 |
| 10,223,380 | B2* | 3/2019 | Giurgiu | H04L 67/12 |
| 10,606,274 | B2* | 3/2020 | Yalla | G01C 21/30 |
| 10,650,682 | B2* | 5/2020 | Grewe | G08G 1/164 |
| 10,761,542 | B1* | 9/2020 | Fairfield | G05D 1/0038 |
| 10,775,795 | B2* | 9/2020 | Tanaka | B60W 40/08 |
| 10,948,302 | B2* | 3/2021 | Kudrynski | G06T 7/75 |
| 10,970,317 | B2* | 4/2021 | Thiel | H04W 4/44 |
| 11,085,774 | B2* | 8/2021 | Thiel | G01C 21/3815 |
| 11,244,566 | B2* | 2/2022 | Yamada | G08G 1/096844 |
| 11,279,367 | B2* | 3/2022 | Kim | G10L 15/32 |
| 11,332,164 | B2* | 5/2022 | Kaji | B60W 60/0051 |
| 11,338,824 | B2* | 5/2022 | Kusayanagi | G08G 1/16 |
| 11,408,740 | B2* | 8/2022 | Yoshida | G09B 29/00 |
| 11,415,423 | B2* | 8/2022 | Sato | G08G 1/0129 |
| 11,458,963 | B2* | 10/2022 | Takamatsu | B60W 30/09 |
| 11,485,354 | B2* | 11/2022 | Hayakawa | G05D 1/0214 |
| 2013/0325329 | A1* | 12/2013 | Gupta | G01C 21/3811 |
| | | | | 701/450 |
| 2015/0310601 | A1* | 10/2015 | Rodriguez | G06Q 20/208 |
| | | | | 348/150 |
| 2017/0010117 | A1 | 1/2017 | Oh | G01C 21/36 |
| 2017/0146360 | A1* | 5/2017 | Averbuch | G01C 21/3679 |
| 2017/0236419 | A1 | 8/2017 | Grewe | |
| 2021/0129868 | A1* | 5/2021 | Nehmadi | G01C 21/26 |
| 2021/0163015 | A1* | 6/2021 | Jang | G08G 1/166 |

FOREIGN PATENT DOCUMENTS

| | | | | |
|---|---|---|---|---|
| CN | 105849998 A | * | 8/2016 | B60L 53/63 |
| DE | 19916967 C1 | | 11/2000 | G01C 21/00 |
| DE | 102012220158 A1 | | 5/2014 | G01C 21/26 |
| DE | 102014220687 A1 | | 4/2016 | G01C 11/00 |
| DE | 10 2016 216 154 | | 3/2018 | G01C 3/06 |
| DE | 102017105086 A1 | | 9/2018 | G01C 11/00 |
| JP | H05173478 A | * | 7/1993 | |
| JP | 3520691 B2 | * | 4/2004 | |
| JP | 3556536 B2 | * | 8/2004 | |
| WO | WO-2017025334 A1 | * | 2/2017 | G01C 21/32 |
| WO | WO-2017025341 A1 | * | 2/2017 | G01C 21/32 |

OTHER PUBLICATIONS

Search Report for International Application No. PCT/EP2019/057099, 13 pages, Jul. 10, 2019.

German Office Action, Application No. 102018204500.3, 6 pages, Oct. 10, 2023.

* cited by examiner

SYSTEM FOR GENERATING CONFIDENCE VALUES IN DIGITAL ROAD MAPS

CROSS-REFERENCE TO RELATED APPLICATIONS

This application is a U.S. National Stage Application of International Application No. PCT/EP2019/057099 filed Mar. 21, 2019, which designates the United States of America, and claims priority to DE Application No. 10 2018 204 500.3 filed Mar. 23, 2018, the contents of which are hereby incorporated by reference in their entirety.

TECHNICAL FIELD

The present disclosure relates to maps. Various embodiments may include object confidence value generation systems for generating confidence values for objects in a digital road map, vehicles having an object recognition device, backends containing a digital road map, methods for generating confidence values for objects in a digital road map, program elements, and/or computer-readable media.

BACKGROUND

Vehicles are increasingly equipped with driver assistance systems that assist the driver in performing driving maneuvers. Furthermore, vehicles are increasingly being equipped with highly or fully automatic driving functions. Highly precise digital road maps are required for these highly or fully automatic driving functions in order to ensure safe and reliable navigation of the vehicles and to recognize objects such as traffic signs or road markings. Furthermore, these digital road maps must always have the current status of the roads and traffic signs in order to enable the highly or fully automatic driving functions. Furthermore, modern vehicles have a large number of sensors for capturing the vehicle surroundings.

SUMMARY

Teachings of the present disclosure may be used to update, to change, or to create a digital road map. For example, some embodiments may include an object confidence value generation system for generating confidence values for objects (31) in a digital road map (3), having: a backend (2); and an object recognition device (1) for a vehicle (4), the object recognition device (1) having: a capture unit (13); an evaluation unit (10); a positioning unit (11); and a transceiver unit (12), wherein the capture unit (13) is configured so as to capture surroundings data of a vehicle (4), wherein the positioning unit (12) is configured so as to determine the position of the captured surroundings data and of the objects (31) contained therein, wherein the evaluation unit (10) is configured so as to recognize the objects (31) and concealments (21) of the objects (31) in the surroundings data and to provide them with position information, wherein the transceiver unit (12) is configured so as to transmit the data generated by the evaluation unit (10) to the backend (2), wherein the backend (2) is configured so as to receive the data from the transceiver unit (12) and to generate or to update the digital road map (3), wherein each of the objects (31) in the digital road map (3) of the backend (2) has a confidence value; wherein the backend (2) is configured so as to increase the confidence value of the respective object (31) if the respective object (31) is contained in the received data, and wherein the backend (2) is configured so as to reduce the confidence value of the respective object (31) if the respective object (31) is not contained in the received data, wherein the backend (2) is configured so as not to reduce the confidence value of the respective object (31) in the event of a concealment (21) of the object (31) in the received data.

In some embodiments, the evaluation unit (10) is configured so as to evaluate the surroundings data of a section (5) of a route covered by the vehicle (4), and the transceiver unit (12) is configured so as to transmit the data of the entire section (5) to the backend (2).

In some embodiments, the section (5) is 100 m long.

In some embodiments, the evaluation unit (10) is configured so as to initially classify all of the captured surrounding regions around the vehicle (4) as concealed regions (21) in the respective section (5) and, if an object (31) has been recognized in a surrounding region or if no concealment (21) is recognized in the surrounding region, to classify the corresponding surrounding region as a visible region, wherein the backend (2) is configured so as not to incorporate the concealed surrounding regions into the determination of the confidence values of the individual objects (31) in the digital road map (3).

In some embodiments, the system furthermore comprises: a storage unit (14) wherein a digital road map (3) containing a multiplicity of objects (31) is stored in the storage unit (14), wherein the evaluation unit (10) is configured so as to compare the recognized objects (31) with the objects (31) stored in the storage unit (14), wherein the evaluation unit (10) is furthermore configured so as to report recognized objects (31) that are not present in the digital road map (3) in the storage unit (14), or unrecognized objects (31) that should have been recognized according to the digital road map (3), to the backend (2).

In some embodiments, the backend (2) is configured so as to transmit the digital road map (3) to the storage unit (14) of the object recognition device (1) at periodic time intervals.

In some embodiments, the backend (2) is configured so as to transmit only objects (31) having a confidence value above a predefined threshold value to the storage unit (14) of the object recognition device (1).

In some embodiments, the backend (2) is configured so as to evaluate the received data and to remove or to integrate unrecognized objects (31) or new objects (31) into the digital road map (3) of the backend (2) based on the received data.

In some embodiments, the data transmitted by the transceiver unit (12) are vector data.

As another example, some embodiments include a vehicle (4) having an object recognition device (1), the object recognition device (1) having: a capture unit (13); an evaluation unit (10); a positioning unit (11); and a transceiver unit (12), wherein the capture unit (13) is configured so as to capture surroundings data of a vehicle (4), wherein the positioning unit (11) is configured so as to determine the position of the captured surroundings data and of the objects (31) contained therein, wherein the evaluation unit (10) is configured so as to recognize the objects (31) and concealments (21) of the objects (31) in the surroundings data and to provide them with position information, wherein the transceiver unit (12) is configured so as to transmit the data generated by the evaluation unit (10) to a backend (2).

As another example, some embodiments include a backend (2) containing a digital road map (3) and confidence values for the objects (31) therein, wherein the backend (2) is configured so as to receive the data from a transceiver unit (12) and to generate or to update the digital road map (3), wherein each of the objects (31) in the digital road map (3) of the backend (2) has a confidence value; wherein the backend (2) is configured so as to increase the confidence value of the respective object (31) if the respective object (31) is contained in the received data, and wherein the backend (2) is configured so as to lower the confidence value of the respective object (31) if the respective object (31) is not contained in the received data, wherein the backend (2) is configured so as not to reduce the confidence value of the respective object (31) in the event of a concealment (21) of the object (31) in the received data.

As another example, some embodiments include a method for generating confidence values for objects in a digital road map, having the following steps: capturing (S1) surroundings data by way of a capture unit; determining (S2) the position of the captured surroundings data and of the objects contained therein; evaluating (S3) the captured surroundings data; recognizing (S4) objects and concealments of objects in the surroundings data; providing (S5) the recognized objects and the concealments of the objects with position information; transmitting (S6) the evaluated data from a transceiver unit to a backend; generating (S7) or updating the digital road map of the backend based on the received data; increasing (S8) the confidence value of the respective object if the respective object is contained in the received data; reducing (S9) the confidence value of the respective object if the respective object is not contained in the received data, wherein the respective object is not reduced in the event of a concealment of the object in the received data.

As another example, some embodiments include program elements that, when they are executed on an evaluation unit (10) and a backend (2) of an object confidence value generation system, prompt the evaluation unit (10) and the backend (2) to perform methods as described herein.

As another example, some embodiments include computer-readable media on which one or more program elements as described herein are stored.

BRIEF DESCRIPTION OF THE DRAWINGS

Further features, advantages, and possible applications of the teachings of the present disclosure emerge from the description of the exemplary embodiments and the figures that follows. The figures are schematic and not to scale. If the same reference signs are specified in the description of the figures that follows, they denote identical or similar elements.

DETAILED DESCRIPTION

Various embodiments of the teachings herein include object confidence value generation systems for generating confidence values for objects in a digital road map. The object confidence value generation systems include a backend and an object recognition device for a vehicle. The object recognition device includes a capture unit, an evaluation unit, a positioning unit, and a transceiver unit. The capture unit is configured to capture surroundings data of a vehicle. The positioning unit is configured to determine the position of the captured surroundings data and of the objects contained therein. The evaluation unit is configured to evaluate the surroundings data captured by the capture unit and to recognize objects and concealments of the objects in the surroundings data and to provide them with position information. The transceiver unit is configured to transmit the data evaluated by the evaluation unit to the backend.

The backend is configured to receive the data from the transceiver unit and to generate, to change or to update the digital road map. Furthermore, each of the objects in the digital road map of the backend has a confidence value. The backend is furthermore configured to increase the confidence value of the respective object if the respective object is contained in the received data, and to reduce the confidence value of the respective object if the respective object is not contained in the received data, wherein the confidence value of the respective object is not reduced in the event of a concealment of the object in the received data.

In order to improve the quality of digital road maps, these may be continuously updated, changed, or generated on the basis of data collected or generated by the vehicles themselves. To this end, a digital road map may be present on a backend and a plurality of object recognition devices, for example in vehicles, may be used as sensors on the road. Traffic guidance (the route) and objects such as traffic signs may in particular thus be updated, changed or generated in the digital road map.

For this purpose, each of the objects in the digital road map may have an individual confidence value that indicates the reliability of the information, for example the existence, the position or the content, about this object. This confidence value may be changed by the backend based on data from the object recognition device or a multiplicity of object recognition devices. The confidence value may for example be between 0 and 1, with 1 indicating maximum reliability of the information about the respective object and 0 indicating minimum reliability of this information. The underlying idea in this case may be that a multiplicity of object recognition devices recognize or do not recognize an object (because it is no longer present).

It is thereby possible on average to exclude, eliminate or reduce individual errors in the recognition by individual object recognition devices. As a result, the confidence value of the object is able to be gradually adjusted and changes to the objects in road traffic may thus be captured automatically and continuously by the backend, such that an up-to-date representation of reality is always able to be shown in the digital road map on the backend.

If the confidence value of a new object (not previously present in the digital road map) exceeds a predefined threshold value, it may be assumed that this object is also present in reality and it may be added to the digital road map. If on the other hand the confidence value of an object falls below a predefined threshold value, it may be assumed that this object is no longer present in reality and it may thus be removed from the digital road map.

The backend may increase the confidence value of an object if it has been recognized by the object recognition device and is contained in the data transmitted to the backend. The backend may furthermore reduce the confidence value of an object if this was not recognized by the object recognition device or is not contained in the data transmitted to the backend. The backend may furthermore not change or adjust the confidence value of the object in the digital road map if the region of the supposed object is concealed, for example by another traffic participant (truck) or a structure (tree). Due to the concealment, the object was not able to be recognized by the object recognition device because it was not visible. It is thereby also possible to prevent falsification of the confidence value, since some objects may often be concealed on a road with heavy traffic flow, and these would therefore have an excessively low confidence value. In other words, the confidence value is not changed or adjusted if concealment of the supposed object has been recognized.

In some embodiments, the backend may also incorporate further parameters into the change in the confidence value of the objects, such as for example the temporal profile. In other words, if for example an object was present in the last 10 transmitted items of data that is not present in the digital road map of the backend, this may be a new object that should be added to the digital road map. The same may be true for an object that should be removed from the digital road map, for example if an object has not been recognized in the last 10 transmitted items of data without there being concealment, the object may be removed from the digital road map because it is probably no longer present in reality, even though the confidence value may still be high. In other words, the most up-to-date recognition or lack of recognition of the object may have a greater influence on the confidence value than older recognitions. In some embodiments, the confidence values may decrease over time if they are not confirmed by new recognitions.

The term "digital road maps" or "digital maps" should also be understood as meaning road maps for advanced driver assistance systems (ADASs), without navigation taking place. In particular, these digital road maps may be stored and created in a backend.

In this case, an object may be for example a traffic sign, a guardrail, a road marking, traffic lights, a roundabout, a crosswalk or a speed bump.

In some embodiments, the transceiver unit may transmit the data to the backend wirelessly, over the air. The data may be wirelessly transmitted and/or wirelessly received by Bluetooth, WLAN (for example WLAN 802.11a/b/g/n/ac or WLAN 802.11p), ZigBee or WiMax or else by means of cellular radio systems such as GPRS, UMTS, LTE or 5G. It is also possible to use other transmission protocols. The cited protocols provide the advantage of the standardization that has already taken place.

Backend may be understood as meaning a computing unit that is located outside one's own vehicle and is available for a multiplicity of vehicles or object recognition devices. The backend may be for example a server or a cloud, which is able to be reached via the Internet or another network.

In some embodiments, some steps may be performed by the object recognition device for the vehicle and some steps may be performed in the backend. The distribution between the evaluation by the evaluation unit of the object recognition device and the backend may furthermore be adjusted to the respective application case. In some embodiments, the entire evaluation may also be performed in the backend. In this case, the object recognition device of the vehicle serves as data capture unit for the backend. The evaluation may however also be performed on the object recognition devices, and the result is then transmitted or conveyed to the backend, where the data from the individual vehicles are merged, thereby creating the digital road map with corresponding confidence values for each object in the digital road map, for example traffic signs.

In some embodiments, the evaluation unit is configured to evaluate the surroundings data of a section of a route covered by the vehicle. The transceiver unit is configured to transmit the data of the entire section to the backend at the same time. In other words, the object recognition device in the vehicle may first collect and evaluate the data for a particular section and then transmit the result for the entire section to the backend.

In some embodiments, in the case of the evaluation in sections, the section may also be referred to as a snippet, the recognition (visibility) or the concealment (invisibility) may be expanded by a probability value for the correct recognition. This increases when the object has been recognized in as many individual images (frames) of the section as possible or it is concealed. Thus, not only discrete values such as 0 (concealment) and 1 (recognition) may occur for the recognition or concealment, but also any values in between. The respective sections may furthermore also be defined with a certain overlap with respect to one another, such that a plurality of images (frames) are also present for the start of the respective section and the start does not consist of just one image. In some embodiments, the recognitions in the sections may be normalized such that the number of recognitions is divided by the number of total images present that were able to recognize the respective object.

By virtue of transmitting the data to the backend in sections, the evaluation of recognizable and concealed regions may also be performed completely in the backend. In other words, the vehicle or the object recognition device in the vehicle serves as data capture unit and the data processing or the evaluation takes place in the backend. This means that a highly accurate position is not required for every object, but rather only for the beginning of the section. The rest of the position determination may be implemented using the image data in the backend, wherein the backend typically has a higher computational power than the evaluation unit. By virtue of the transmission in sections, highly accurate position information needs to be transmitted to the backend only for the beginning and the end of the respective section, and the backend may then calculate, determine or ascertain the respective positions, the objects and the concealments from the received data.

In some embodiments, the section is 100 m long. It should be noted that any other desired length may also be selected for the section, such as for example 200 m, 500 m, or 1 km. The section may furthermore be adjusted depending on the road or the surroundings, such that the section is shorter in urban surroundings than in rural surroundings or on an expressway. This may be advantageous since there are typically more objects over an identical section length in urban surroundings. The section may furthermore also be defined on the basis of a fixed file size, for example 5 MB, 25 MB or 1 GB, but the section or the length of the section may also be defined on the basis of a combination of the abovementioned criteria.

In some embodiments, the evaluation unit is configured so as to initially classify all of the captured surrounding regions around the vehicle as concealed regions in the respective section. If an object has been recognized in a surrounding region or if no concealment has been recognized in the surrounding region, the corresponding surrounding region is classified as a visible region. The backend is configured not to incorporate the concealed surrounding regions into the determination of the confidence values of the individual objects in the digital road map.

In some embodiments, the evaluation unit may evaluate the captured data in sections, that is to say for each section or snippet, and transmit them to the backend. When evaluating the section, it is also possible to proceed in such a way that all regions are initially classified as concealed regions, that is to say regions in which it is not possible to make a statement about any objects. These concealed regions are then gradually classified as recognized regions by way of the evaluation by the evaluation unit (recognized objects or recognized concealment). In other words, the recognized region gradually becomes larger the more objects have been recognized therein. The regions that are not recognized remain classified as concealed regions and a confidence value of an object that may possibly be located in this region is not adjusted, since a reliable statement is not possible due to the concealment or the lack of recognition in this region.

In some embodiments, the object recognition device furthermore has a storage unit. This storage unit contains a digital road map containing a multiplicity of objects. The evaluation unit is furthermore configured to compare the recognized objects with the objects stored in the storage unit. The evaluation unit is configured so as to report recognized objects that are not present in the digital road map in the storage unit, or unrecognized objects that should have been recognized according to the digital road map, to the backend.

In some embodiments, the object recognition device may furthermore have a storage unit in which a digital road map is stored. The digital road map on the memory card may furthermore be updated at regular intervals by the backend, such that the up-to-date version of the digital road map is always available for the evaluation unit of the object recognition device. The evaluation unit may furthermore compare the recognized objects with the objects in the digital road map in the storage unit. The evaluation unit may then report recognized or unrecognized objects directly to the backend. By way of example, if an object is present in the digital road map but has not been recognized by the evaluation unit, then the confidence value of the object may be reduced in the backend. If an object has been recognized by the evaluation unit that is present in the digital road map, the confidence value of the object may be increased in the backend. If an object has been recognized by the evaluation unit that is not contained in the digital road map, the recognized object may be added to the digital road map in the backend. In some embodiments, in the case of the evaluation of the captured data in sections, the data may be buffer-stored in the storage unit until they are transmitted to the backend.

In some embodiments, the positioning unit is a GPS module. Furthermore, it should be pointed out that, within the context of the present disclosure, GPS is representative of all global navigation satellite systems (GNSSs), such as for example GPS, Galileo, GLONASS (Russia), Compass (China) or IRNSS (India). In some embodiments, the position of the vehicle may also be determined by means of cell positioning. This is particularly beneficial when using GSM, UMTS, LTE or 5G networks.

In some embodiments, the surroundings data are camera images, camera images from a stereo camera, laser images, lidar images or ultrasound recordings.

In some embodiments, the digital road map is intended for a vehicle or for the navigation of a vehicle. The digital road map created in the backend may be intended for a vehicle in order to enable navigation for said vehicle. A precise and up-to-date digital road map is essential, in particular in the case of highly or fully automated vehicles.

In some embodiments, the backend is configured so as to transmit the digital road map to the storage unit of the object recognition device at periodic time intervals. In other words, the backend may forward the digital road map that is generated, updated, changed and/or improved there to the object recognition device of the vehicle or vehicles at certain intervals, such that the evaluation unit of the object recognition device in turn has the up-to-date version of the digital road map available again. These periodic intervals may be for example once a month, every day or once a year. The backend may furthermore also transmit the digital road map to the vehicle as required, for example when navigation has been started on the vehicle.

In some embodiments, the backend is configured so as to transmit only objects having a confidence value above a predefined threshold value to the storage unit of the object recognition device. In other words, objects may be incorporated into the digital road map and transmitted to the object recognition device if the confidence value of the objects in the digital road map on the backend exceeds a predefined threshold value, for example have a confidence value of over 90%. This may be used to ensure that only objects that are very likely to be present are transmitted to the vehicle.

In some embodiments, the backend is configured so as to evaluate the received data and to remove, to integrate or to add unrecognized objects or new objects into the digital road map of the backend based on the received data. In other words, the backend may change and update the digital road map based on the data received from the transceiver unit of the object recognition device and, if necessary, add new objects or remove old objects, such that there is always an up-to-date digital road map on the backend that represents the current road conditions. The backend may furthermore update the exact position of the individual objects in the digital road map based on the received data, for example since the position is able to be determined more precisely on average by the individual object recognition devices due to an increasing number of recognitions of the respective object.

In some embodiments, the data transmitted by the transceiver unit are vector data. In order to keep the amount of data transmitted between the object recognition device and the backend small or low, the data may be transmitted in the form of vector data, that is to say the information about the existence of an object and its position may be transmitted, and not all of the image data.

In some embodiments, there is a vehicle having an object recognition device. The object recognition device has a capture unit, an evaluation unit, a positioning unit and a transceiver unit. The capture unit is configured to capture surroundings data of a vehicle. The positioning unit is configured to determine the position of the captured surroundings data and of the objects contained therein. The evaluation unit is configured to evaluate the surroundings data captured by the capture unit and to recognize objects and concealments of the objects in the surroundings data and to provide them with position information. The transceiver unit is configured so as to transmit the data evaluated by the evaluation unit to a backend.

The vehicle is for example a motor vehicle, such as an automobile, a bus or a truck, or else a rail vehicle, a ship, an aircraft, such as a helicopter or an airplane, or for example a bicycle.

In some embodiments, there is a backend containing a digital road map and confidence values for the objects therein. The backend is configured to receive the data from a transceiver unit and to generate, to change or to update the digital road map. Furthermore, each of the objects in the digital road map of the backend has a confidence value. The backend is configured so as to increase the confidence value of the respective object if the respective object is contained in the received data, and the backend is configured so as to reduce the confidence value of the respective object if the respective object is not contained in the received data, wherein the backend does not reduce the confidence value of the respective object in the event of a concealment of the object in the received data.

In other words, the backend may receive data from an object recognition device of a vehicle. The backend may use the objects or concealments contained in the data to change the confidence values of the objects in the digital road map. It should be noted that the object recognition device may in this case perform an evaluation before the data are sent to the backend or else the object recognition device sends all of the data captured by the capture unit to the backend and the data are evaluated (for the most part) in the backend. In other words, the capture unit may capture surroundings data of a vehicle, and these may then be evaluated by the evaluation unit of the object recognition device or by the backend. The data may in this case be transmitted continuously or in sections from the object recognition device to the backend.

The data of the object recognition device may contain a plurality of different objects or concealments of objects. Based on these objects or concealments of objects, the backend may change the confidence values of the objects contained in the digital road map on the backend. A confidence value of an object in the digital road map may in this case for example be increased if the object is contained in the data of the object recognition device. A new object may furthermore be added to the digital road map if an object is contained in the data of the object recognition device, but no object has been present up to now at this position in the digital road map. It is thus possible to add new objects to the digital road map on the backend, and the digital road map is always able to be kept up to date. The backend may furthermore lower or reduce the confidence value of an object if an object contained in the digital road map has not been recognized by the object recognition device. This reduction in the confidence value may not be performed if the object recognition device recognizes a concealment in the region of the object. In other words, the capture unit of the object recognition device was not able to recognize any object at all, since said object was concealed, and no adjustment of the confidence value takes place since no definitive statement is able to be made.

In some embodiments, the backend may remove an object from the digital road map if the confidence value of this object falls below a predefined threshold value, for example 60%, or if the object has not been recently recognized by a predefined number of vehicles. "Old" objects that in reality are no longer present may therefore be removed from the digital road map.

During the evaluation of the data by the evaluation unit of the object recognition device, the object recognition device may report an unrecognized object, that is to say an object that should have been recognized but was not recognized, directly to the backend. To this end, however, a digital road map is required as a comparison in the object recognition device; this may be stored on a storage unit, for example. Newly recognized objects, that is to say that were not present until now in the digital road map of the object recognition device, may also be reported to the backend.

In some embodiments, it is possible to adjust or change not only the confidence values of the objects, that is to say whether an object is present or not, but also its exact position, that is to say where the object is located and the content thereof, in particular in the case of changing and dynamic display panels. The more object recognition devices recognize an object and determine its position, the more accurately the "correct" position of the real object is able to be determined. Furthermore, a probability density function for the correct position may also be determined around the respective object.

It should be noted that the backend may simultaneously receive and process data from a multiplicity of object recognition devices of different vehicles. The respective object recognition devices of the vehicles may thus be used as sensors in order to keep the digital road map on the backend up-to-date, to update it or to change it and to add new objects or to delete old objects. The up-to-date digital road map may furthermore be forwarded to the object recognition devices of the vehicles by the backend, such that they always have available the up-to-date digital road map.

In some embodiments, there is a method for generating confidence values for objects in a digital road map, having the following steps: capturing surroundings data by way of a capture unit determining the position of the captured surroundings data and of the objects contained therein; evaluating the captured surroundings data; recognizing objects and concealments of objects in the surroundings data; providing the recognized objects and the concealments of the objects with position information; transmitting the evaluated data from a transceiver unit to a backend; generating or updating the digital road map of the backend based on the received data; increasing the confidence value of the respective object if the respective object is contained in the received data; reducing the confidence value of the respective object if the respective object is not contained in the received data, wherein the respective object is not reduced in the event of a concealment of the object in the received data.

It should be noted that the steps of the method may also be performed in a different order or at the same time. There may furthermore also be a longer period between individual steps. Some embodiments include program elements that, when they are executed on an evaluation unit and a backend of an object confidence value generation system, prompt the evaluation unit and the backend to perform the method described above and below. Some embodiments include a computer-readable medium on which a program element is stored that, when it is executed on an evaluation unit and a backend of an object confidence value generation system, prompts the evaluation unit and the backend to perform the method described above and below.

Figure 1:
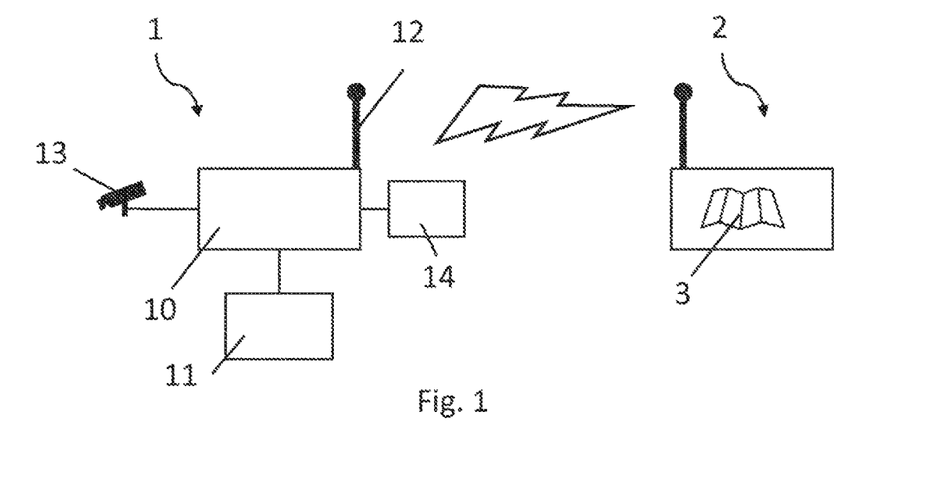
FIG. 1 shows a block diagram of an object confidence value generation system incorporating teachings of the present disclosure.

FIG. 1 shows a block diagram of an object confidence value generation system. The object confidence value generation system has an object recognition device 1 and a backend 2. The object recognition device 1 for its part has an evaluation unit 10, a positioning unit 11, a transceiver unit 12, a capture unit 13 and a storage unit 14. The object recognition device 1 and the backend 2 may exchange data with one another; this may take place for example wirelessly via mobile radio networks. A digital road map 3, which is updated, changed, or generated with data from the object recognition device, may be present on the backend 2. The backend 2 may furthermore transmit data, such as the up-to-date digital road map 3, to the object recognition device 1. The transceiver unit 12 of the object recognition device 1 may be used in particular for the data exchange.

The capture unit 13 may be configured to capture surroundings data; in particular, the capture unit may capture surroundings data of a vehicle by way of different sensors. The capture unit 13 may be for example a camera, a stereo camera, a lidar sensor, a radar sensor, an ultrasound sensor or a combination thereof. The capture unit 13 may capture temporally successive surroundings data, for example a video or a plurality of individual successive images (frames).

The positioning unit 11 may be configured to determine the position of the object recognition device 1 and of objects and concealments captured by the capture unit 13. For example, the positioning unit 11 may be a GPS sensor. The storage unit 14 may contain a digital road map and the storage unit may furthermore be used as a buffer store if a transmission to the backend takes place in sections. The evaluation unit 10 of the object recognition device 1 may be configured to recognize objects or concealments in the captured surroundings data and to provide them with a position.

In this case, an object may be for example a traffic sign, a guardrail, a road marking, traffic lights, a roundabout, a crosswalk or a speed bump. The evaluation unit 10 may furthermore recognize a concealment, that is to say an installation, for example a truck or a tree, that conceals the object to be recognized, that is to say is located between the object to be recognized and the capture unit 13. It is thus not possible to recognize an object since the object was not first captured by the capture unit 13 at all.

The evaluation unit 10 may furthermore be configured to compare the captured and recognized objects with the objects stored in the storage unit 14, such that the evaluation unit 10 is able to establish whether an object that is not present in the digital road map in the storage unit 14 has been recognized, or that an object should have been present according to the digital road map stored in the storage unit 14 but was not recognized by the evaluation unit 10. The object recognition device 1 may report these recognized or unrecognized objects directly to the backend 2. In other words, the evaluation may be performed by the evaluation unit 10 and the result is sent to the backend 2 in order accordingly to adjust or to update the digital road map 3 there. It should be noted that the evaluation may also take place in the backend 2; to this end, the object recognition device 1 sends all of the captured surroundings data from the capture unit 13 to the backend 2 and the backend 2 evaluates the data. It is thus possible to save on computational power on the object recognition device 1.

In some embodiments, the surroundings data may be evaluated in sections, that is to say in fixed sections of for example 100 m, wherein the individual sections may be referred to as snippets.

The evaluation unit 10 may furthermore be configured so as to initially classify everything as concealed regions and then, when objects have been recognized, to gradually classify them into captured regions, such that all regions that are not reliably recognized are considered to be concealments and no statement is able to be made there about the objects located there, that is to say the confidence value of these objects is not updated or adjusted in this case. This procedure may be particularly expedient in the case of the evaluation in sections, since an object is able to be captured over a certain period of time or over a certain distance through a plurality of different viewing angles and distances. It should be noted that the individual sections or snippets may adjoin one another directly, but these may also each have an overlapping region such that information from a plurality of viewing angles and distances is already available even at the beginning of a respective section.

Multiple recognitions of an object in a section may furthermore also increase the probability, that is to say the confidence value, of a correct capture. By way of example, it may be possible to determine a factor for each object in a respective section that reflects the correctness of the recognition of the object. To this end, this factor may be for example between 0 and 1, wherein 1 means that the object was captured and recognized by the evaluation unit 10 in all temporally consecutive surroundings data. In other words, the factor may be the number of recognitions of an object in the surroundings data of a section through the total amount of available surroundings data.

By way of example, a section consists of 1000 individual images or frames and a particular object was recognized in 850 of these images, and the factor may thus be determined as 0.85. As an alternative or in addition, the factor may also be in the form of a number of recognitions of the respective object based on the number of possible recognitions. By way of example, the position of the object may be in the middle of a section, such that the object was able to be captured only through half of the available surroundings data, for example the section consists of 1000 individual images but the object was only able to be present in 500 images or frames due to its position, and the object was recognized on 460 of these 500 images, and the factor may thus be determined as 0.92. In other words, the respective object is present in 92% of the surroundings data.

These evaluated data with the respective factors may be transmitted to the backend 2, and the backend 2 may in turn adjust, change or update the confidence value of the respective object in the digital road map 3 based on these data. The data may be transmitted by the transceiver unit 12 to the backend 2 both continuously and in sections, in snippets.

Figure 2:
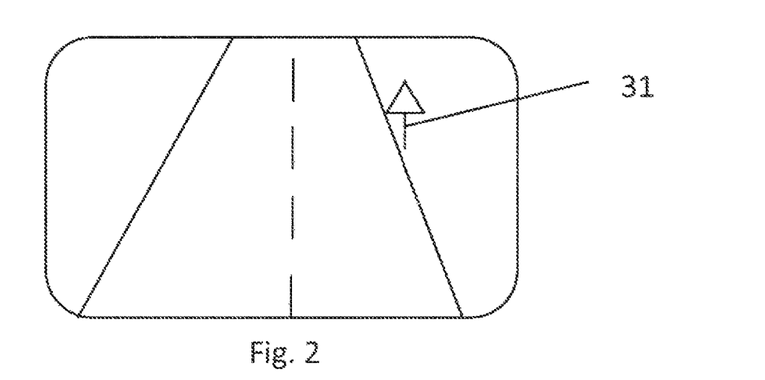
FIG. 2 shows a schematic illustration of surroundings data containing a recognized object incorporating teachings of the present disclosure.

FIG. 2 shows an exemplary image of the surroundings data. A road is illustrated in this case. At the edge of this road is a traffic sign that is recognized as object 31 by the evaluation unit or by the backend. This image or the position of the recognized object 31 may be transmitted to the backend, which in turn accordingly increases the confidence value of this object in the digital road map in the backend.

Figure 3:
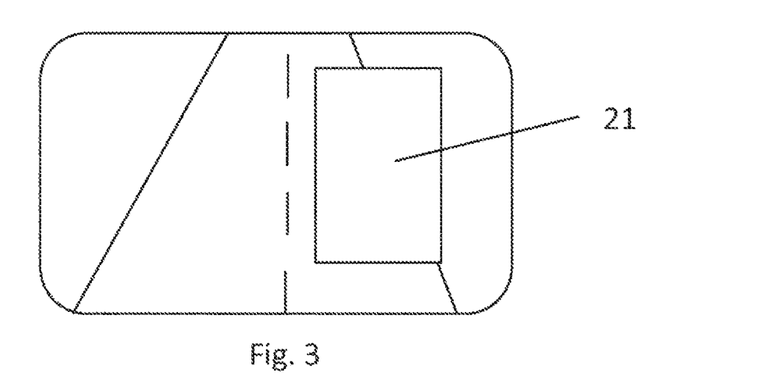
FIG. 3 shows a schematic illustration of surroundings data containing a concealment incorporating teachings of the present disclosure.

FIG. 3 likewise shows an exemplary image of the surroundings data, but in this case the object is concealed by a concealment 21. The evaluation unit or the backend are thus not able to recognize any object at this position. In other words, the concealment prevents the object from being recognized. The concealment may be caused for example by another traffic participant, such as a truck, or by a tree. If an object to be recognized is located behind a concealment, the confidence value of this object is not adjusted, since no statement is able to be made about the object.

Figure 4:
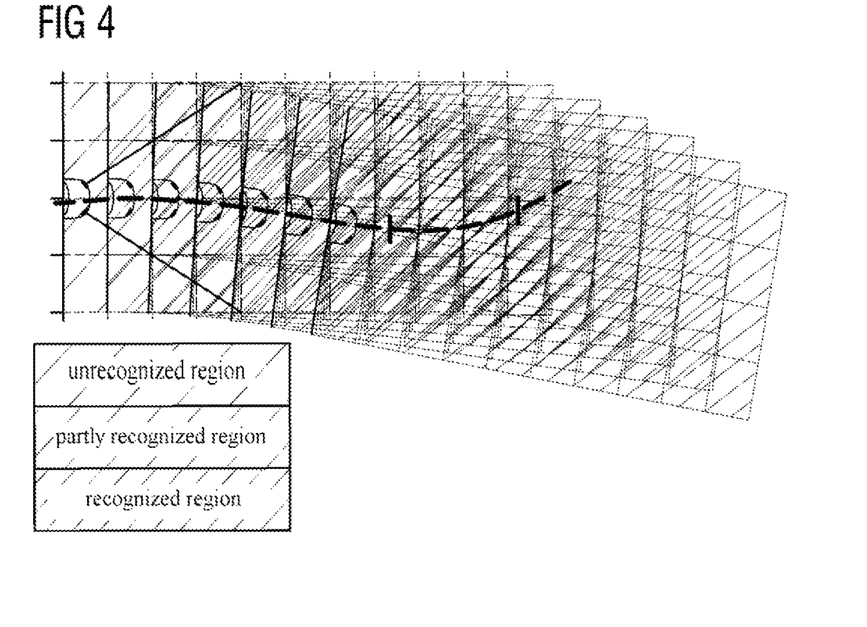
FIG. 4 shows a schematic illustration of a vehicle trajectory with evaluation of the surroundings data in sections, incorporating teachings of the present disclosure.

FIG. 4 shows a profile of a vehicle 4 over a certain time along a specific route. This route is illustrated in FIG. 4 by the dashed black line. The plurality of vehicles 4 that are illustrated furthermore symbolize the profile of the one vehicle 4 along this route. The route may in this case be divided into a plurality of sections 5 (snippets). The different sections 5 are shown in FIG. 4 by the thick vertical bars transverse to the direction of the route. The sections 5 may have a fixed distance, for example 100 m. The capture unit of the object recognition device of the vehicle 4 has a respective specific viewing angle. In FIG. 4, regions are shown in different shades of gray to the left, to the right and in front of the vehicle 4; these regions symbolize which regions of the surroundings data of the vehicle 4 were recognized by the object recognition device and which were not. A light gray region symbolizes an unrecognized region and a dark gray region symbolizes a region recognized by the object recognition device. It should be noted that the further along the vehicle 4 is on the route, the higher the probability that the region has been recognized, since the object recognition device has recorded a large number of individual images or frames in which the region was able to be recognized.

At the beginning of the route, the capture unit is able to recognize only the objects in front of the vehicle and only some of the objects to the side, and the further the vehicle moves along the route, the more often the object recognition device has the chance to recognize an object in the vehicle surroundings or the more often an object or a concealment has been recognized, and as soon as a recognition has taken place, they are classified as recognized. Between an unrecognized region and a recognized region, the region may also have been partially recognized by the object recognition device or have been recognized only in a few image data or frames.

In some embodiments, all of the regions may initially be classified as unrecognized regions and, as soon as a recognition takes place, this region may be classified as a recognized region. The confidence value of the recognized region may furthermore be increased with increasing recognitions in a plurality of images or frames; this is represented by an increasingly intense gray value in FIG. 4.

Figure 5:
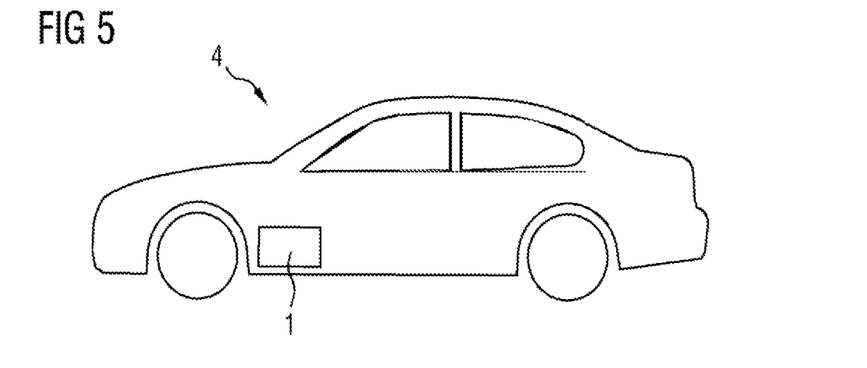
FIG. 5 shows a vehicle having an object recognition device incorporating teachings of the present disclosure.

FIG. 5 shows a vehicle 4 having an object recognition device 1. This object recognition device 1 is able to capture surroundings data around the vehicle 4 and recognize objects and concealments therein. The object recognition device 1 may furthermore transmit the evaluated data to the backend. A multiplicity of vehicles 4 may furthermore use an object recognition device 1 to capture and evaluate surroundings data and transmit them to the backend.

Figure 6:
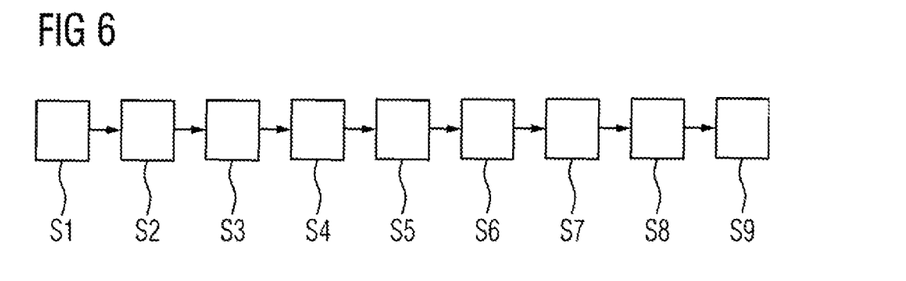
FIG. 6 shows a flowchart for a method for generating confidence values for objects in a digital map in the backend incorporating teachings of the present disclosure.

FIG. 6 shows a flowchart for a method for generating confidence values for objects in a digital road map. In a first step S1, surroundings data may be captured by a capture unit. These surroundings data may be individual images or frames or a whole section of successive images or frames. In a second step S2, the position of the captured surroundings data and of the objects contained therein may be determined. The captured surroundings data may be evaluated in step S3 and, in step S4, objects and concealments may be recognized in the surroundings data. In step S5, the objects and concealments recognized in step S4 may be provided with position information. In step S6, the evaluated data may be transmitted to a backend by way of a transceiver unit. Then, in step S7, the digital road map may be generated, changed or updated on the backend based on the received data. In step S8, a confidence value of a respective object may be increased if the respective object is contained in the received data. In step S9, a confidence value of an object may be reduced if the object is not contained in the received data, unless the object was concealed by a concealment such that it was not able to be recognized in the captured surroundings data.

What is claimed is:

1. A system for generating, storing, and providing a digital road map, the system comprising:
a backend including a memory; and
an object recognition device including: a capture unit, an evaluation unit, a location sensor, and a transceiver in communication with the backend;
wherein the capture unit includes a camera and/or a sensor configured to capture surroundings data of a vehicle;
the location sensor comprises a global navigation satellite system or a cell positioning device configured to analyze the surroundings data to determine a position of the captured surroundings data and objects contained in the surroundings data;
the evaluation unit includes a processor programmed to recognize and identify the objects based on the surroundings data and to associate the objects with position information and to assess the surroundings data for concealed objects including objects stored in the digital road map but not recognizable in the surroundings data;
wherein the objects include one or more of: a guardrail, a road marking, traffic lights, a roundabout, a crosswalk, and a speed bump;
wherein the processor is further programmed to slice the digital road map into multiple sections based on a size of the section, wherein the size depends on both a geographical distance and a density of identified objects in the surroundings data;
the transceiver transmits information generated by the processor to the backend in separate packets, each packet containing one of the multiple sections;
the backend is configured to generate or to update the digital road map based on information from the transceiver;
each of the objects in the digital road map has an associated confidence value;
the backend increases the confidence value of a respective object if the respective object is contained in the received data;
the backend reduces the confidence value of the respective object if the respective object is not contained in the received data; and
the backend maintains the confidence value of any concealed object in the received data; and
the backend stores the digital road map including the objects along with the corresponding confidence value for each respective object.

2. The system as claimed in claim 1, wherein:
the processor is further programmed to evaluate the surroundings data of a section of a route covered by the vehicle; and
the transceiver transmits the data of the section to the backend.

3. The system as claimed in claim 2, wherein the section is 100 m long.

4. The system as claimed in claim 1, wherein:
the processor is further programmed to initially classify all of the captured surrounding regions around the vehicle as concealed regions in the respective section and, if an object has been recognized in a surrounding region or if no concealment is recognized in the surrounding region, to classify the corresponding surrounding region as a visible region; and
the backend is configured not to incorporate the concealed surrounding regions into the determination of the confidence values of the individual objects in the digital road map.

5. The system as claimed in claim 1, the object recognition device furthermore including a memory storing a digital road map containing a multiplicity of objects;

wherein the processor is further programmed to compare the recognized objects with the multiplicity of objects; and the processor is further programmed to report recognized objects not present in the stored digital road map or unrecognized objects should have been recognized according to the digital road map to the backend.

6. The system as claimed in claim 1, wherein the backend transmits the digital road map to a memory of the object recognition device at periodic time intervals.

7. The system as claimed in claim 6, wherein the backend transmits only objects having a confidence value above a predefined threshold value to the memory.

8. The system as claimed in claim 1, wherein the backend evaluates the received data and removes or integrates unrecognized objects or new objects into the digital road map based on the received data.

9. The system as claimed in claim 1, wherein the data transmitted by the transceiver comprise vector data.

10. A vehicle comprising:
an object recognition device including: a capture unit, an evaluation unit, a location sensor, and a transceiver;
wherein the capture unit includes a camera and/or a sensor configured to capture surroundings data;
the location sensor comprises a global navigation satellite system or a cell positioning device configured to determine a position corresponding to the captured surroundings data and of any objects contained in the surroundings;
the evaluation unit includes a processor programmed to recognize and identify the objects based on the surroundings data and to associate the objects with position information and to assess the surroundings data for concealed objects including objects stored in the digital road map but not recognizable in the surroundings data;
wherein the identified objects include one or more of: a guardrail, a road marking, traffic lights, a roundabout, a crosswalk, and a speed bump;
wherein the processor is further programmed to slice the digital road map into multiple sections based on a size of the section, wherein the size depends on both a geographical distance and a density of identified objects in the surroundings data;
the transceiver transmits data generated by the processor to a backend in separate packets, each packet containing one of the multiple sections.

11. A backend storing a digital road map and confidence values for objects in the map;
wherein the backend slices the digital road map into multiple sections based on a size of the section, wherein the size depends on both a geographical distance and a density of identified objects in the surroundings data;
wherein the identified objects include one or more of: a guardrail, a road marking, traffic lights, a roundabout, a crosswalk, and a speed bump;

wherein the backend is programmed to receive data from a transceiver in separate packets, each packet containing one of the multiple sections and to generate or to update the digital road map;
wherein each object in the digital road map has an associated confidence value;
wherein the backend is programmed to increase the confidence value of a respective object if the respective object is represented in the received data; and
wherein the backend is programmed to lower the confidence value of the respective object if the respective object is not represented in the received data;
wherein the backend is programmed to maintain the confidence value of any concealed object in the received data; and
the backend stores the digital road map including the objects along with the corresponding confidence value for each respective object.

12. A method for maintaining a digital road map, the method comprising:
capturing surroundings data with a capture unit including a camera and/or a sensor;
determining a position of the captured surroundings data and any objects contained therein using a location sensor comprising a global navigation satellite system or a cell positioning device;
evaluating the captured surroundings data using a processor;
slicing the digital road map into multiple sections based on a size of the section, wherein the size depends on both a geographical distance and a density of objects in the surroundings data;
recognizing and identifying objects and concealed objects in the surroundings data based on the evaluation;
wherein the identified objects include one or more of: a guardrail, a road marking, traffic lights, a roundabout, a crosswalk, and a speed bump;
providing the identified objects and the concealed objects with position information from the location sensor;
transmitting the evaluated data using a transceiver to a backend in separate packets, each packet containing one of the multiple sections;
generating or updating the digital road map stored in the backend based on the received data;
increasing a confidence value of the respective object if the respective object is represented in the received data;
reducing the confidence value of the respective object if the respective object is not represented in the received data; and
maintaining the confidence value of any concealed object in the received data; and
the backend stores the digital road map including the objects along with the corresponding confidence value for each respective object.

* * * * *